United States Patent [19]

Grinde

[11] Patent Number: 4,497,220
[45] Date of Patent: Feb. 5, 1985

[54] DIFFERENTIAL PLANETARY GEAR SYSTEM FOR PRODUCING COMPLEMENTARY LEVELS OF FORWARD/REVERSE DRIVE

[75] Inventor: James E. Grinde, Anoka, Minn.

[73] Assignee: Yamaha Hatsudoki Kabushiki Kaisha, Iwata, Japan

[21] Appl. No.: 487,970

[22] Filed: Apr. 25, 1983

[51] Int. Cl.³ .................. F16H 3/56; F16H 3/70
[52] U.S. Cl. ...................... 74/792; 74/342; 74/789
[58] Field of Search ............. 74/789, 792, 797, 802, 74/342, 344, 352, 355, 361, 376, 404, 776

[56] References Cited

U.S. PATENT DOCUMENTS

| | | | |
|---|---|---|---|
| 712,893 | 11/1902 | Baldner | 74/695 |
| 759,875 | 5/1904 | Gansert | 74/792 |
| 1,033,752 | 7/1912 | Williamson, Jr. | 74/792 |
| 1,323,299 | 12/1919 | MacFarlane | 74/792 |
| 2,131,677 | 9/1938 | Sharpe | 74/792 |
| 3,109,326 | 11/1963 | Holtan | 74/792 |
| 3,685,371 | 8/1972 | Crooks | 74/792 |
| 3,908,483 | 9/1975 | Piquette | 74/792 |

Primary Examiner—Lawrence J. Staab
Assistant Examiner—Dwight G. Diehl
Attorney, Agent, or Firm—Orrin M. Haugen; Thomas J. Nikolai; Douglas L. Tschida

[57] ABSTRACT

An epicyclic planetary gear system having a plurality of partially meshed straight-cut primary and secondary planetary gears slidably mounted in a slidable differential housing and partially meshed with respective straight-cut input and output gears. Forward drive is achieved in each of a plurality of forward drive ranges by the respective coupling of the primary planet gears with the secondary planet gears and output gear and the secondary planet gears with the input gear. Reverse drive is similarly achieved for each of the forward ranges via the coupling of the input gear only with the secondary planet gears and the output gear only with the primary planet gears, while restraining rotation of the differential housing.

6 Claims, 8 Drawing Figures

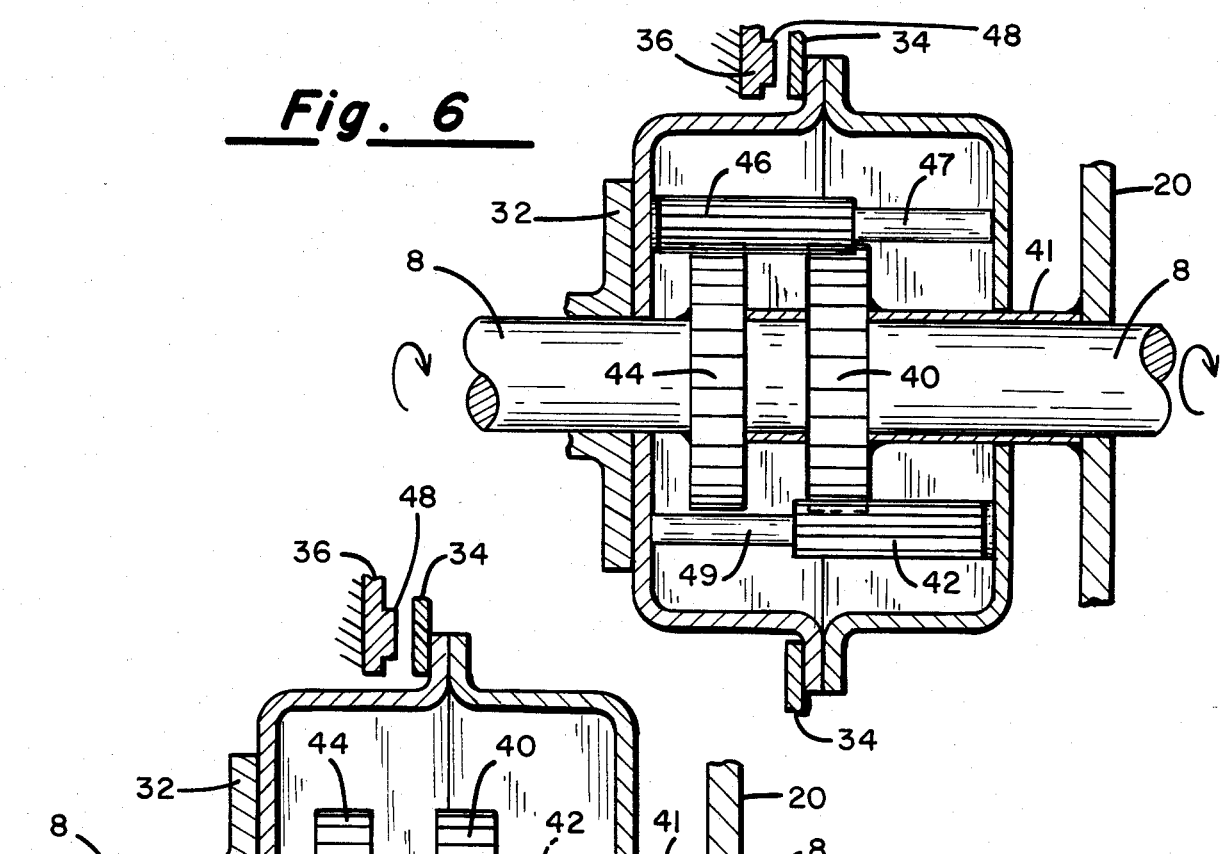
Fig. 6
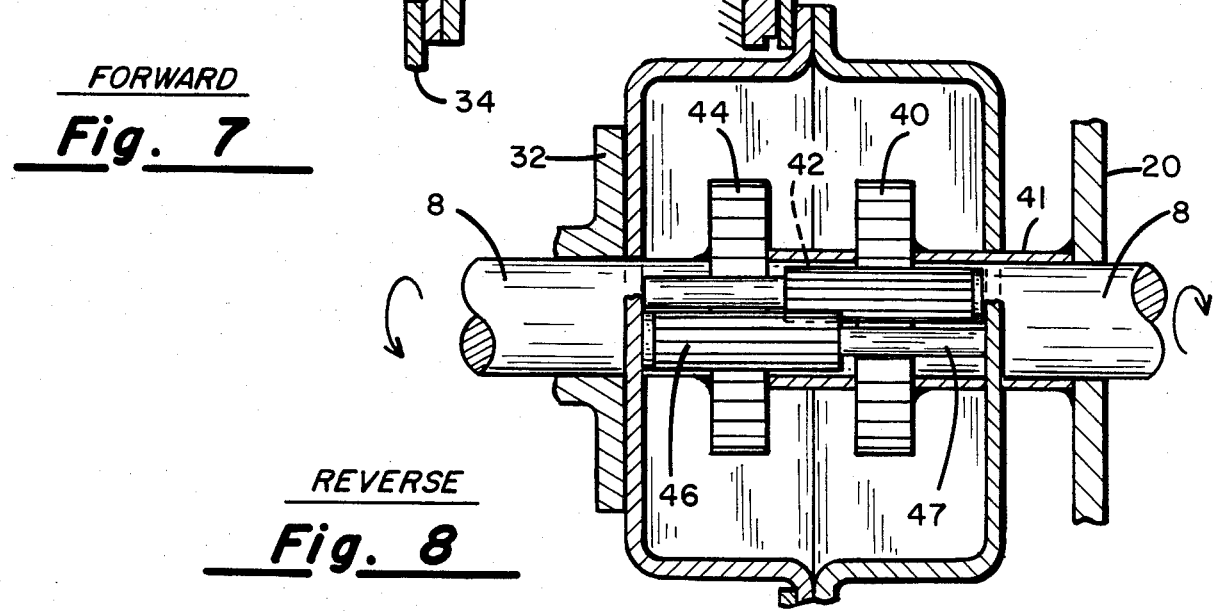
FORWARD
Fig. 7
REVERSE
Fig. 8

DIFFERENTIAL PLANETARY GEAR SYSTEM FOR PRODUCING COMPLEMENTARY LEVELS OF FORWARD/REVERSE DRIVE

BACKGROUND OF THE INVENTION

The present invention relates to power transmission systems and in particular to a multi-range forward-/reverse manual drive transmission for use with shaft or chain driven vehicles, such as employed in all-terrain vehicles or similar lightweight vehicles.

With the advent of the snowmobile, outdoor recreation vehicles for off-road use have become increasingly popular. One type of such vehicles are popularly referred to as all-terrain vehicles (ATV'S) and are comprised of a lightweight chassis and molded plastic body, both of which are supported by three or four studded, balloon-like tires. Such ATV'S are extremely mobile and suitably adapted for traveling over various types of ground conditions.

Most typically such vehicles are configured in three or four-wheel designs that employ clutch driven, chain drive power trains (although shaft driven power trains are becoming more prevalent), whereby power is transferred from the engine and clutch transmission to the chain and sprocket associated with the rear axle. Typically, such vehicles provide for four or five speeds forward (with no reverse) and which is sufficient to permit the operator to select the proper speed and gear range for the particular ground conditions.

While such vehicles are generally able to surmount most encountered obstacles, occasionally they bog down or become stuck so as to require the operator to dismount and push or lift the chassis so as to un-stick the vehicle. Alternatively, the operator may establish a rocking motion by intermittently applying power in one or more of the various forward gears until the vehicle frees itself. Such action, however, is somewhat tedious, frustrating and wearing on the clutch so that it is desirable to incorporate a reverse gear feature into the ATV.

While reverse gear features are often encountered in riding lawn mowers or the like, most typically the related power trains are belt driven and, therefore, easily reversed by properly manipulating the V-belts and pulleys. The chain-drive mechanism of the typical ATV does not, however, easily accommodate the reverse gear feature in a ruggedized, yet economical, fashion. A reverse feature has previously been employed in the Suzuki LT125. The reverse drive employed there, however, appears to provide for only one drive range in reverse and requires the operator to first disengage the drive train so as to place it in a neutral range, before separately engaging a second mechanism, whereby the reverse drive is achieved. It should be obvious, however, that such a reverse drive is not advantageous to the typical operator, in that such a multi-step engagement mechanism is rather cumbersome and not conducive to establishing a rocking motion, should it become necessary when unsticking an ATV.

The present invention, however, employs a planetary differential gear assembly mountable to the rear axle and having a plurality of partially meshed primary and secondary, straight-cut planetary gears which may be brought to properly engage associated and centrally displaced input and output gears. The differential housing is selectively and slidably actuable via a lever and associated caliper and counteracting spring and stop for restraining the differential housing and permitting the engagement of the gears in either the forward or the reverse drive direction for each of the various drive ranges of the clutch transmission. Thus, complimentary forward and reverse drives are achievable for each of the speed ranges.

Various reversing transmissions have also been noted in U.S. Pat. Nos. 712,893; 2,131,677; 3,109,326; 759,875; 3,685,371; and 3,908,483. While various of these transmissions employ slidably interacting gear assemblies in conjunction with input and output shafts, none employs or suggests the present inter-meshed, slidable planetary gear system.

The above objects, advantages and distinctions of the present invention as well as various others will, however, become more apparent upon a reading of the following description with respect to the following drawings. It is to be recognized though that the following description is made with respect only to various presently preferred embodiments and considered modifications, although numerous others might be suggest to those of skill in the art. Therefore, the present invention is not to be considered narrowly, but rather broadly, and to include all such equivalent structures as may be made without departing from the spirit and scope of the present invention.

SUMMARY OF THE INVENTION

A multi-speed forward/reverse planetary differential gear system for lightweight vehicles. The differential comprises a slidable, shaft-mounted differential housing having an input gear, an output gear and one or more pairs of partially meshed primary and secondary planet gears. The gears are arranged such that the secondary planet gears always engage the input gear, while the primary planet gears always engage the output gear. Reverse operation is achieved via a lever actuated caliper associated with the otherwise rotatable differential housing, and which upon engagement, slidably displaces the differential housing to one side against a counteracting spring force and restraining mechanism so as to lock the differential housing and cause the primary and secondary planet gears to separately engage the respective output and input gears. Forward operation is achieved upon disengaging the differential housing so as to cause the primary planet gears to also mesh with the input gear.

Due to the intermeshing of the various gears, self-synchronization is achieved and complimentary reverse rotation can be achieved for each of the various forward speed ranges. The straight-cut gears in an economical fashion further facilitate manufacture and assembly.

DESCRIPTION OF THE DRAWINGS

FIG. 6 shows a generalized single planetary pair gear system of the present type.

FIG. 7 shows generalized power transfer schema for the forward gear for a single planetary gear pair, of the type shown in FIG. 4.

FIG. 8 shows a generalized power transfer schema for the reverse gear for a single planetary gear pair of the type in FIG. 4.

DESCRIPTION OF THE PREFERRED EMBODIMENT

Figure 1:
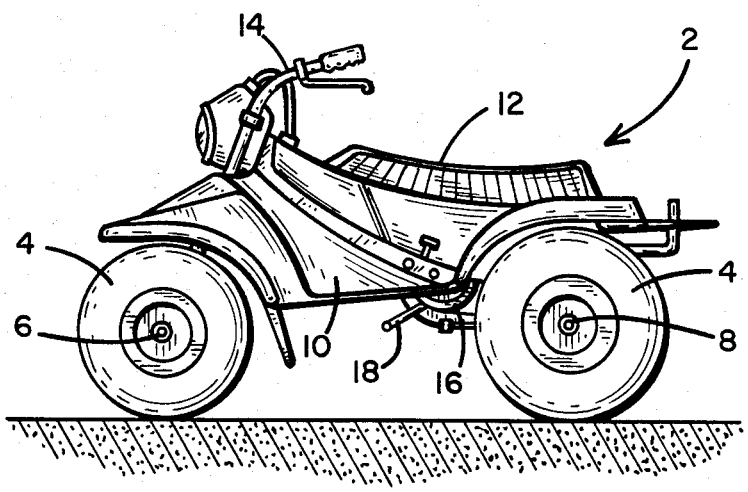
FIG. 1 shows a side elevation of a typical four-wheel ATV.

Referring to FIG. 1, a side elevation view is shown of a typical four-wheel ATV 2, and which generally is comprised of four balloon-like, studded off-road tires 4. Two of the tires 4 are mounted to a front axle 6 and two of the tires are mounted to a chain-driven rear axle 8. The front tires 4 are, typically, slightly smaller than the rear tires 4. The tires 4 and axles 6 and 8 are, in turn, mounted to a tubular frame chassis (not shown) and which supports a molded plastic body 10 having an associated padded seat cushion 12. The attendant throttle and brake controls are mounted to the handle bars 14, while the motor 16 is centrally mounted to the chassis at a point generally beneath the seat 12 and the point at which the operator sits. The reverse shift controls (not shown) are, in turn, mounted at a point convenient to the operator, but out of the way of inadvertent disengagement, while the shift peddle 18 is mounted near the engine 16.

Figure 2:
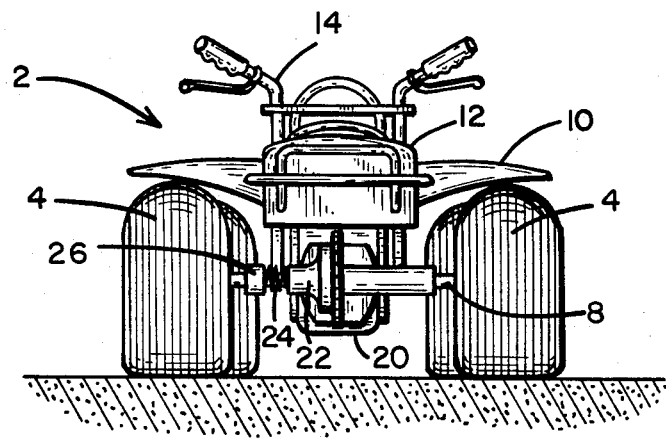
FIG. 2 shows a rear view of a typical ATV employing the present differential gear system.

Upon referring to FIG. 2, the present invention can be seen in its relative relationship to the aforementioned portions of the typical four-wheel ATV 2. Specifically, a rear differential reversing assembly has been added to the rear axles 8 adjacent the rear chain sprocket 20 and which is comprised of a differential housing 22, return spring 24 and spring stop 26. The power is thus applied to the gear assembly (not shown) contained within the differential housing 22 via the centrally disposed chain sprocket 20 and from which it is transferred to the rear axle 8 and rear wheels 4. As depicted in FIG. 2, the differential housing 22 of the ATV 2 is shown in its forward drive position, but it is to be recognized that in its reverse drive position it will be disposed to the left of its present position and closer to the spring stop 26 so as to compress the return spring 24. Such details will, however, become more apparent as the description thereof progresses.

Before continuing, it should also be recognized that while the present description is directed to an ATV 2 having a unitary axle 8, alternatively it may be incorporated into drive systems having split axles such as in a transfer type differential, as disclosed in a co-pending patent application entitled, "Recreational Vehicle With Limited Differential", Ser. No. 346,136, assigned to the present assignee. Further, the present invention may alternatively be mounted in a more forward in-line or direct relationship to the engine 16's output shaft, intermediate the clutch transmission. Still further, the present invention may be employed in a shaft driven power train, either in-line with the drive shaft or in combination with the real axle as disclosed herein. Such alternative mountings would, however, require some modifications to the chassis to accommodate the different drive train configurations, but as will become apparent, such changes would easily be accomplished by one of skill in the art and would not affect the general operation of the present forward/reverse differential assembly.

Figure 3:
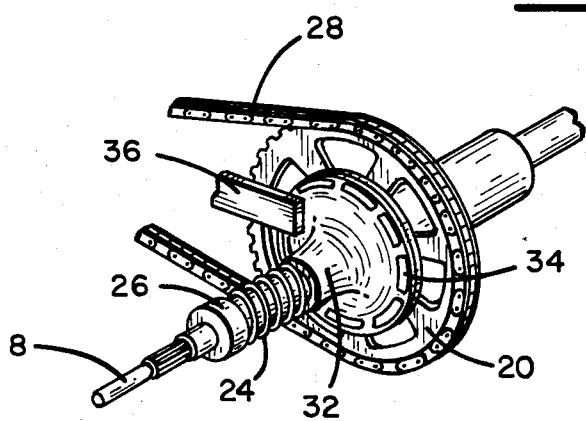
FIG. 3 shows a perspective view of the present differential assembly.

Referring next to FIG. 3, while bearing in mind the mounting of FIG. 2, a perspective view is shown of the present forward/reverse differential gear assembly in its relationship to the partially sectioned axle 8. Specifically, the present forward/reverse gearing arrangement is achieved via the coupling of the chain 28 and its associated sprocket 20 to an input gear (not shown) mounted within the differential housing 22. An output gear (not shown) coupled to the rear axle 8 transfers proper rotational power via a sliding planetary gear assembly that is coupled to the input and output gears to the rear wheels 4. Such rotation is achieved, in part, by the adjacent differential housing 22, which is fabricated in two portions, a planetary gear containing portion 32 and notched disk portion 34. Intermediate the chain sprocket 20 and the notched disk 34 is a lever actuated yoke-like caliper (not shown) which upon actuation slidably displaces the differential housing 22 to the left against the return spring 24 and spring stop 26 and engages the back of notched disk 34. Upon shifting the lever so as to slidably displace the differential 22, it is to be noted that the notches fabricated on the outer periphery and face of the disk 34 couple with matching stationary dogs that are mounted on a caliper-like assembly 36. Thus, upon shifting the present apparatus into reverse, the differential housing 22 is slidably displaced and held stationary relative to the drive axle 8; otherwise, in forward, the differential housing freely rotates with the axle 8 and remains to the right, adjacent the sprocket 20. It is also to be noted that the forward or reverse inertia of the disk 34 is nominal upon engaging or disengaging the disk notches with the dogs, because the vehicle is not in motion at this time.

While it is necessary to stop the rotation of the differential housing, the actual transfer of the directional rotation of the axle 8 is primarily dependent upon the gear assembly internal to the differential housing 22. A partially cutaway and exploded view of this assembly can be seen upon reference to FIG. 4. From FIG. 4, an input gear 40 is coupled to one end of a sleeve 41 that is concentrically mounted relative to the axle 8 and the other end of which is welded to the sprocket 20 so as to be centrally disposed within the differential housing 22 and engage the various secondary planetary gears 42 that are disposed about the outer periphery thereof. An output gear 44 is, in turn, coupled to the drive axle 8 and also centrally displaced within the differential housing 22 so as to contact a plurality of the primary planetary gears 46. The planetary gears 42 and 46, in turn, partially mesh with one another. Thus, the input gear 40 and sprocket 20 and output gear 44 and axle 8 are all coupled together via the planetary gears 42 and 46. Before continuing, it is to be recognized that the thrust washers, bushings, etc. necessary to maintain the orientation of the input and output gears 40 and 44 relative to the planetary gears 42 and 46 and housing 22 are not shown, although the placement and use thereof would follow normal design practices.

Figure 5:
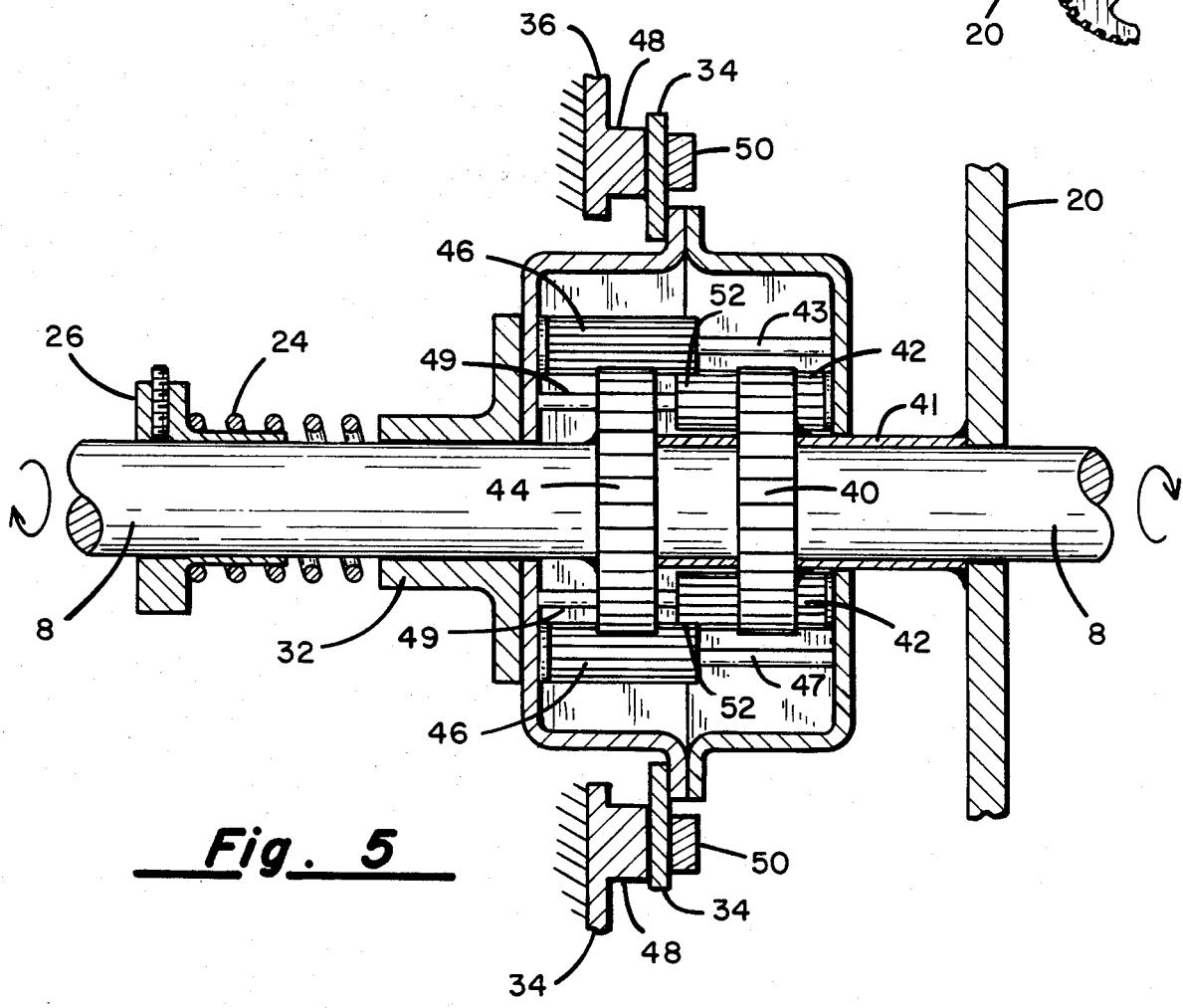
FIG. 5 shows a cross section view of FIG. 3 and the relative relationship and configuration of the components of the present differential gear system.

A more detailed section view showing the intermeshing of the present gears 40, 42, 44 and 46 relative to the differential housing 22, return spring 24 and stationary dogs 48 and yoke-like caliper 50 can be seen upon reference to FIG. 5. In particular, FIG. 5 shows a cross section view of the present differential assembly in a reverse gear and which generally is determined via the relative placement of the overlapped portions of the primary and secondary planet gears 46 and 42 intermediate to the input and output gears 40 and 44. From FIG. 5, it is to be noted that spaced about the periphery of the differential housing 22 are a plurality of partially intermeshed pairs of straight-cut planetary gears 42 and 46. The planetary gears 42 and 46 are held in proper relationship to one another via the respective spacers 47 and 49. In particular, straight-cut upper and lower planetary gear pairs comprised of adjacent and intermeshed primary and secondary planet gears 46 and 42 are positioned such that the intermeshed region 52 for each of the gear pairs is intermediate the input and output gears 40 and 44. Thus, the secondary planet gears 42 each engage the input gear 40 and their adjacent primary planetary gear 46. Similarly, the primary planetary gears 46 intermesh with the output gear 44; and assuming a clockwise rotation of the chain sprocket 20 and input gear 40, the gearing causes the output gear 44 and axle 8 to rotate in the opposite, counter-clockwise or reverse direction.

Forward rotation is, in turn, achieved by disengaging the reverse lever so as to release the yoke-like caliper 50 (see also FIG. 4 and which is caliper 50 generally actuated via a cable control mounted near the operator) thereby permitting the notched disk 34 to release itself from the restraining dogs 48 and to again permit the differential housing 22 to freely rotate with the axle 8. As mentioned, at this point the vehicle is stopped and upon application of power to the sprocket 20 to the input gear 40 begins rotating in a clockwise direction, the input gear 40 now, however, engages each pair of the primary and secondary planet gears 46 and 42 in their overlapped regions 52, while the output gear continues to engage only the primary planet gears 46. Thus, a clockwise rotation is now imparted to the axle 8 so as to rotate the rear wheels 4 in the clockwise or forward direction. From the above, it should be apparent, too, that due to the intermeshed straight-cut gears self-synchronization is easily achieved and that forward/reverse shifting may be performed for any of the speed ranges of the clutch transmission.

The manner of imparting such forward and reverse rotation can alternatively be seen upon reference to FIGS. 6, 7 and 8, and which respectively depict power transfer arrangements for a single planetary gear pair differential system and the present multi-pair differential system. In particular, FIG. 6 depicts an alternative generalized power transfer diagram for a differential assembly comprised of a single primary planet gear 46 and secondary planet gear 42. From FIG. 6, it is to be noted that the forward drive transfer condition is shown and wherein both of the primary and secondary planet gears 46 and 42 mesh with the input gear 40, while the primary planet gear 46 also meshes with the output gear 44. Thus, for this alternative embodiment, the axle 8 is driven in a forward direction, the same as the rotation of the input gear 40.

Figure 4:
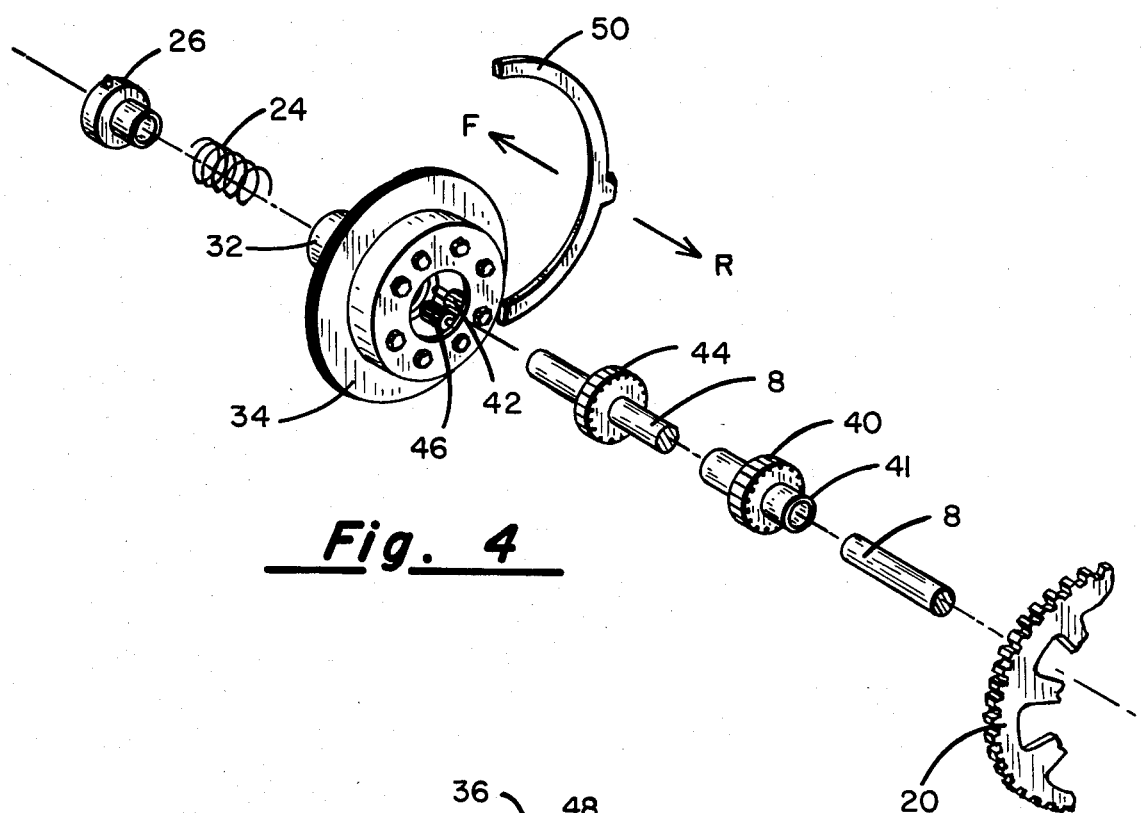
FIG. 4 shows a partially sectioned perspective view of the present planetary gear assembly.

Referring next to FIGS. 7 and 8 and carrying the generalization of the drive imparted by planet gear pairs of the type of FIG. 6 to the more typically encountered multiple pair situation, such as for planet gear arrangements of the present type and as shown in FIG. 4, the present forward and reverse drive schemas will now be described. With respect to FIG. 7 and recognizing that a view is shown of only one planet gear pair relative to the input and output gears, it will be apparent that FIG. 7 depicts a forward gear arrangement. That is, the return spring 24 forces the differential housing 22 to the right such that the primary and secondary planet gears 46 and 42 both engage the input gear, in their region of overlap while the primary planet gear 46 also engages the output gear. Thus, if the input gear 40 is rotating in the clockwise direction so too will the output gear 44 rotate in the clockwise direction.

With respect to FIG. 8, however, if the differential housing 22 is slid to the left via the shift lever so as to cause the notches of disk 34 to engage the caliper dogs 48, the differential housing 22 will stop, while the primary planet gears 46 will be disengaged from the input gear 40. Thus, only the secondary planet gears 42 will engage the input gear 40, while the primary planet gears 46 will only engage the output gear 44. The rotation of the output gear will now be opposite to that of the input gear.

It is to be noted that because straight-cut gears are used with the present apparatus and because the various gears are engaged with one another at all times, the sliding action and attendant synchronization are easily achieved, without damaging the individual gears. Further, such gears are easier to manufacture and thus reduce the attendant manufacturing costs of the present differential assembly.

While the present invention has been described with respect to its presently preferred embodiment and a generalized example thereof, it is to be recognized that the present concepts may be employed in yet other embodiments so as to achieve a reversing drive train, operable in reverse for each of a plurality of forward speed ranges. It is, therefore, anticipated that the present invention and following claims will be interpreted so as to encompass all such equivalent embodiments and modifications thereto which might suggest themselves to those of skill in the art.

What is claimed is:

1. A forward/reverse power transfer assembly comprising:
    (a) a shaft-mounted rotatable housing operable in a forward free rotating mode or a reverse restrained mode;
    (b) a power driven input gear concentrically mounted relative to said shaft;
    (c) a coaxial output gear mounted to said shaft and laterally displaced from said input gear;
    (d) at least one pair of partially intermeshed primary and secondary planetary gears mounted within said housing relative to said input and output gears; and
    (e) mans for controllably engaging said housing between said forward and reverse modes so as to either selectively engage said primary planet gear(s) with said input and output gears and said secondary planet gear(s) with said input gear in said forward mode or engage said primary planet gear with said output gear and said secondary planet gear with said input gear in said reverse mode, forward and reverse rotational drive thereby being imparted to said shaft relative to the rotation of said input gear during said forward and reverse modes.

2. Apparatus as set forth in claim 1 wherein the teeth of said input, output, primary and secondary gears are straight-cut and in constant mesh such that self-synchronization is achieved when shifting between said forward and reverse modes.

3. Apparatus as set forth in claim 1 including a spring and stop mounted adjacent to one side of said housing and means mounted adjacent to said other side of said housing for slidably displacing said housing along said shaft to and from said stop and between said reverse and forward modes.

4. Apparatus as set forth in claim 3 including a stationary dog containing caliper assembly and wherein said housing includes a notched disk having formed therein a plurality of mating notches to said dog and whereby rotational movement of said housing is restrained upon said dog engaging one of said notches.

5. Apparatus as set forth in claim 1 wherein individual spacers are mounted adjacent to each of said primary and secondary planet gears within said housing for maintaining the relative positions thereof and a region of overlap between said primary and secondary planet gears, the position of said overlapped region relative to said input and output gears determining which of said forward or reverse modes said apparatus is operative in.

6. A forward/reverse gear assembly comprising:
(a) a housing rotatively and restrainably mounted relative to an output shaft;
(b) a power driven input gear concentrically mounted within said housing relative to said output shaft;
(c) an output gear coaxially mounted to said shaft adjacent to said input gear;
(d) at least one epicyclic primary planetary gear mounted relative to said housing so as to operatively and alternatively engage only said output gear or both said input and output gears;
(e) at least one secondary planet gear mounted epicyclically within said housing so as to engage said input gear and a portion of said primary planet gear and whereby said output shaft rotates in the same direction as said input gear when said housing is unrestrained and both said primary and secondary planet gears engage said input gear or said output shaft rotates in the opposite direction relative to said input gear when said housing is restrained and said primary planet gear is disengaged from said input gear.

* * * * *